Figure 1:
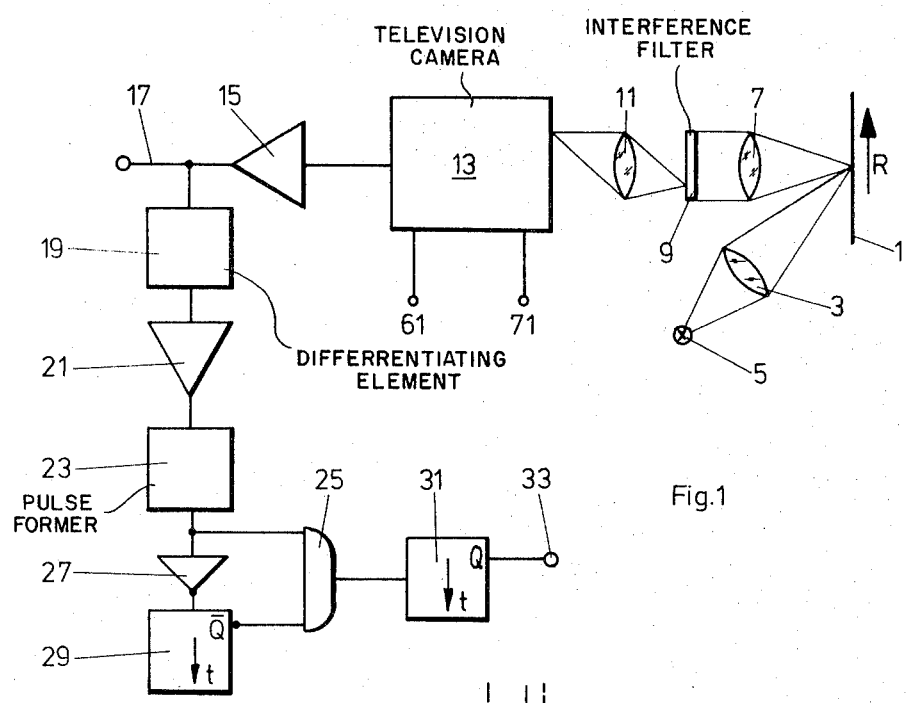

United States Patent [19]
Vinnemann et al.

[11] 3,834,817
[45] Sept. 10, 1974

[54] METHOD AND APPARATUS FOR RECOGNIZING COLORS

[75] Inventors: Antonius Vinnemann, Stuttgart; Joachim Merz, Leinfelden, both of Germany

[73] Assignee: Firma Franz Morat GmbH, Stuttgart, Germany

[22] Filed: Aug. 9, 1972

[21] Appl. No.: 279,025

[30] Foreign Application Priority Data
Aug. 18, 1971 Germany.......................... 2141364

[52] U.S. Cl..................... 356/83, 356/96, 356/100, 356/188, 356/189
[51] Int. Cl............................ G01j 3/42, G01j 3/48
[58] Field of Search......... 356/45, 83, 96, 100, 173, 356/188, 189, 97

[56] References Cited
UNITED STATES PATENTS

| | | | |
|---|---|---|---|
| 2,793,560 | 5/1957 | Rennick | 356/83 |
| 3,437,411 | 4/1969 | Rudomanski et al. | 356/100 |
| 3,457,002 | 7/1969 | Magrath | 356/100 |
| 3,474,671 | 10/1969 | Byron | 356/45 |
| 3,663,813 | 5/1972 | Shaw | 356/83 |

*Primary Examiner*—Vincent P. McGraw

[57] ABSTRACT

A method of scanning and/or distinguishing colors comprising opto-electrically scanning the colors, generating electrical signals the time variation of which correspond to the spectral intensity distribution of the colors and distinguishing the colors by automatically determining the position of the maxima of the electrical signals.

28 Claims, 10 Drawing Figures

METHOD AND APPARATUS FOR RECOGNIZING COLORS

This invention relates to a method of and apparatus for scanning and/or distinguishing colours.

The quality of automatic processes and devices for scanning colour images and for generating electric signals which are characteristic of the scanned image for the purpose of reproduction, evaluation or transmission of the image depends to a great extent on the precision with which the different colours of the image can be distinguished from one another.

For distinguishing colours there are available the known methods of diffraction, refraction and/or interference of the light beams reflected or transmitted from a colour dot when the colour dot is illuminated with natural or monochromatic light. It is known, for example, to split up the reflected or transmitted light beams by means of suitable optical systems into several partial beams associated with different spectral regions and to distinguish the colours according to which or how many partial beams have a certain intensity, using opto-electronic transducers in combination with threshold switches. The electric signals obtained in this way can directly be used for controlling any machine, for example, a sorting, printing or textile machine.

There are also known spectrometers in which the whole emission spectrum of a sample is reproduced by means of diffraction screens in a focal plane and certain spectral regions of the spectrum are scanned. For evaluating the results of measurement it is possible to record the emission spectra photographically or by means of recorders, and to evaluate them manually.

An essential disadvantage of the known methods and devices consists in that they either involve high expenditure and are therefore not suited for scanning and/or distinguishing a plurality of colour dots in rapid succession, or they permit of reliable differentiation between the different colours only if certain instructions are exactly observed during the production, selection, recording and/or scanning of these colours.

According to this invention there is provided a method of scanning and/or distinguishing colours comprising opto-electrically scanning the colours and generating an electrical signal related to the spectral intensity distribution of the colour, deriving pulse edges from electrical signals the time variation of which corresponds to the spectral intensity distribution of the colours, the time position of these pulse edges representing the position of the maxima of this intensity distribution, and distinguishing the colours according to the time position of the pulse edges.

The invention uses the characteristic magnitude of a colour for distinguishing this colour from other colours, i.e., the position of its maximum or maxima in the curve corresponding to the spectral intensity distribution, which is largely independent of outside interferences. Variations of the intensity of illumination or different degrees of covering ability, for example, do not affect the position of the maxima at all, and even changes of the colour temperature shift the local position of the maximum only to such a small extent that a colour can be safely recognized in spite of this displacement.

According to the invention there is also provided apparatus for scanning and/or distinguishing colours, comprising at least one opto-electrical transducer, an optical system for illuminating the colours and focusing the light reflected or transmitted by the colours to the transducer, means associated with the transducer for scanning the spectrum of the colours by selecting a moving narrow region thereof, a circuit for generating a pulse edge at the points corresponding to the maxima of the spectral intensity distribution, and an evaluation circuit for distinguishing the colours according to the position of the pulse edges.

Figure 2:
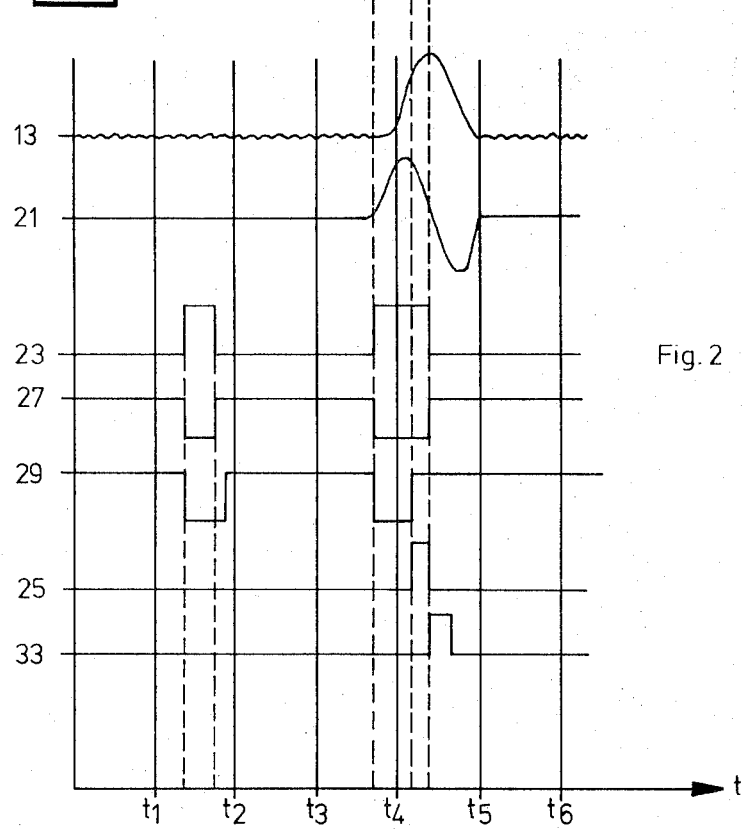
Figure 3:
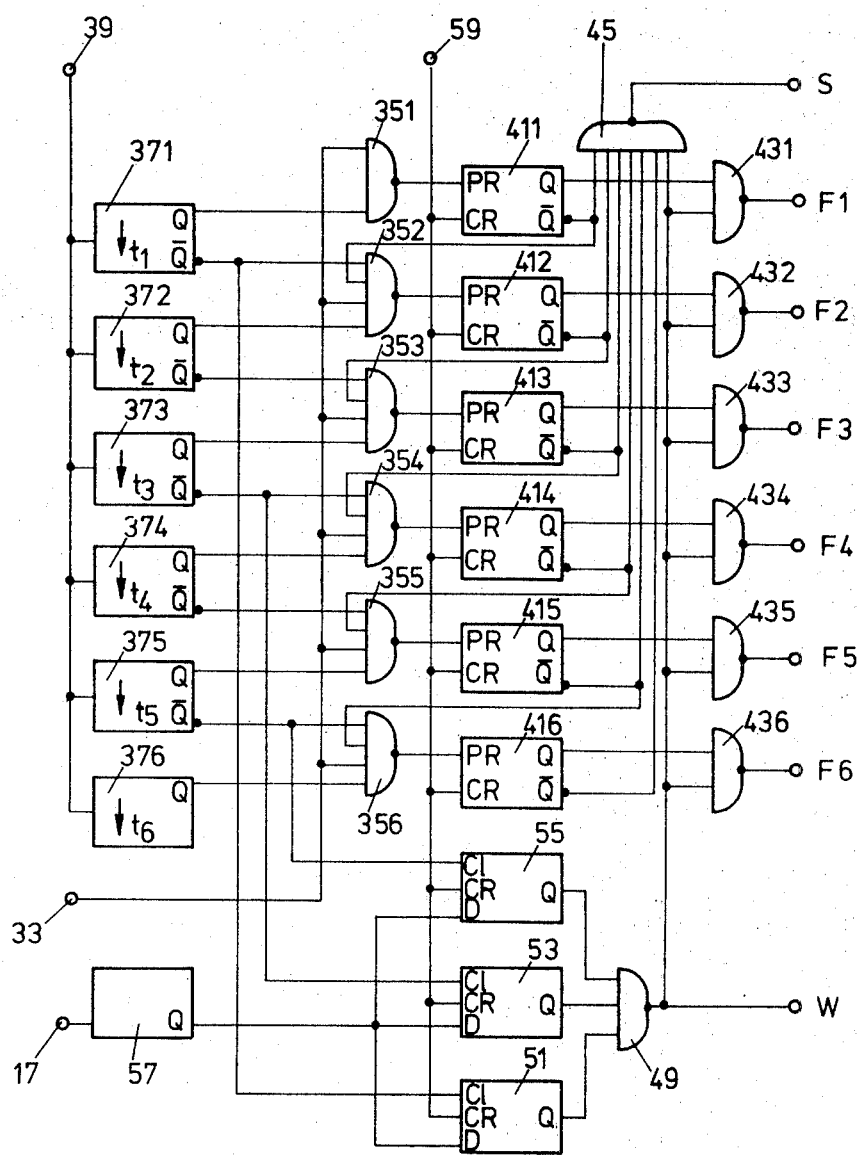
Figure 4:
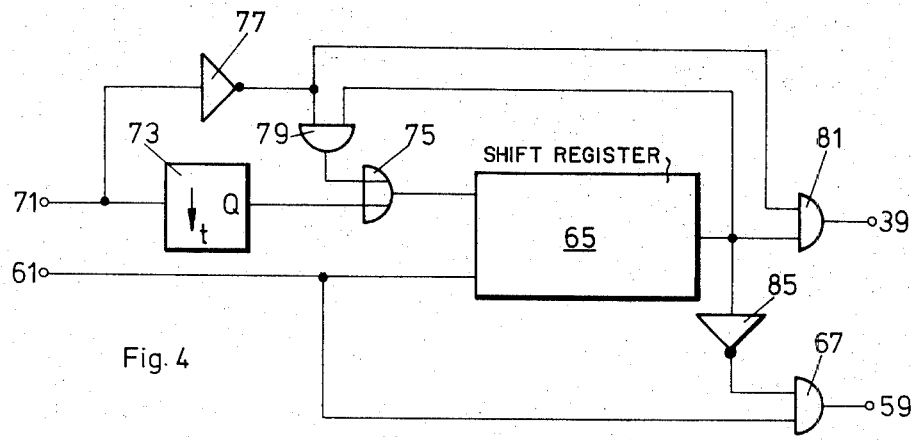
Figure 7:
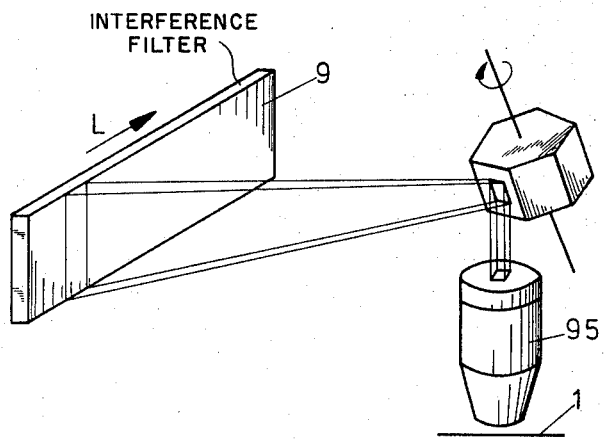
Figure 8:
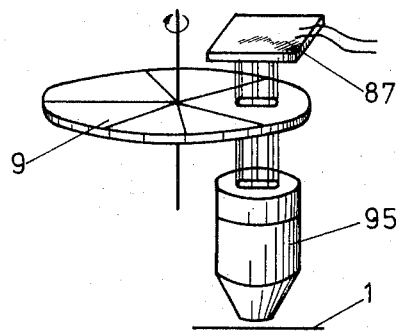
Figure 9:
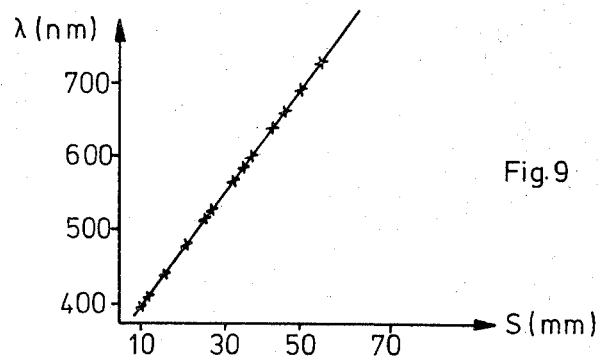

The invention will now be described in more detail, by way of example, with reference to the accompanying drawings, in which:

FIG. 1 is a diagrammatic view of the structure of a device embodying the invention for generating pulse edges at the points corresponding to the maxima of a colour, FIG. 2 illustrates the pulse forms of some of the signals generated with the device of FIG. 1, FIG. 3 illustrates an evaluation circuit for the pulse edges generated with the device of FIG. 1, FIG. 4 illustrates an additional appliance for the device of FIG. 1 for the purpose of scanning several colour dots of an image at the same time, FIGS. 5 to 8 and FIG. 10 illustrate different ways of generating electrical analogue signals corresponding to the spectral intensity distribution, and FIG. 9 illustrates the calibration curve of a variable density interference filter.

The apparatus illustrated permits a multi-coloured image to be established with utmost speed and precision and be converted into unambiguous electric signals. Moreover, the electric signals are affected as little as possible by variations of the illumination during the scanning operation or by the degree of covering ability which the images to be scanned possess, i.e., by the degree to which the colour of the substrate of the image shines through after the colour to be scanned has been applied.

Firstly, FIG. 1 shows an image 1. This image 1 consists for example, of a plurality of colour dots arranged raster-like in horizontal lines and vertical columns, each colour dot being of a single colour and the whole image being composed of dots of different colours.

The light arriving from a white light source 5 is focussed onto the image 1 by means of a lens 3 in such a way that only a single colour dot is illuminated at a time. The light beam reflected by a colour dot of the image is made parallel by means of a further lens 7 and then reproduced over the whole width of a variable-density interference filter 9 so that the whole spectral region of the filter 9 is illuminated. For this purpose there may be used, for example, photoconductor cross-section converters.

The side of the filter opposite the illuminated side is scanned via a further lens 11 by means of a television camera 13. The arrangement is such that the scanning beam of the television camera 13, while traversing one line, scans the whole width of the filter 9 or the whole visible spectral region of the colour dot depicted on the filter.

With this arrangement, the amplitude of the electric video signal appearing at the output of the television camera 13 has a time variation corresponding to the spectral intensity distribution which results from the scanning of an individual colour dot on the reverse of the filter 9 as a function of position.

The output of the television camera is connected to an amplitude 15 which preferably has also the properties of a low-pass element so that the video signal is not only amplified but also sufficiently stabilised. The output 17 of the amplifier 15 leads to the input of a differentiating element 19 at the output of which appears the differentiated video signal which is subsequently amplified in a further amplifier 31 the output of which is connected to a pulse former 23.

Since the time variation of the video signal corresponds to the spectral intensity distribution of the scanned colour, there appears at the output of the television camera 13, for example, the video signal shown in line 13 of FIG. 2, which has a maximum at the point characteristic of the scanned colour. After the differentiation of the video signal in the differentiating element 21, there results the signal shown in line 21 of FIG. 2 whose negative part is suppressed in the pulse former 23, whereas the positive part is converted as in line 23 of FIG. 2 into a positive square-wave pulse the trailing edge of which exactly coincides with the maximum of the video signal. This pulse edge can therefore directly be used for identifying the scanned colour by connecting the output of the pulse former 23 to a monostable circuit or monoflop 31 in order to generate from each negative pulse edge at the Q-output of the latter a positive pulse of duration $t$ whose leading edge exactly corresponds to the maximum of the colour (see line 33 in FIG. 2).

However, such a circuit has the disadvantage that short negative interfering signals which appear at the output of the pulse former 23 and are not associated with a specific colour, would likewise generate a positive pulse at the output 33 of the monoflop 31 and this could lead to faults. To increase the safety, the output of the pulse former 23 is therefore connected to one input of an AND element 25, on the one hand, and, via an inverting stage 27, to the input of a further monoflop 29, on the other hand, the Q-output of the latter being connected to the other input of the AND element 25 whose output is connected to the input of the monoflop 31. Since it can be assumed that the pulse width of the interfering signal is substantially smaller than the width of the signals characteristic of a colour, the switching time $t$ of the monoflop 29 will be chosen somewhat smaller than the smallest possible width of the maximum of the video signal which can be established by experiment.

Due to this measure, all interfering signals are suppressed. Referring to FIG. 2, the monoflop 29 is actuated by the landing edges of the signals arriving at the output of the reversing stage 27 so that a negative signal of during $t$ arrives at its $\overline{Q}$-output, blocking the AND element 25 for the duration $t$. If the width of the maximum of the video signal and, consequently, the width of the pulse at the output of the pulse former 23 is greater than the time interval $t$, then the AND element 25 is reopened shortly before the end of this pulse, and a short signal appears at its output, its trailing edge exactly corresponding to the maximum of the video signal and giving rise to a change-over of the monoflop 31 at the output of which a positive pulse of the preselected length $t$ is then formed (lines 25 to 33 in FIG. 2). If, however, the width of the pulse at the output of the pulse former 23 is smaller than the time $t$ determined by the monoflop 29, then the AND element 25 is still blocked when the trailing edge of this pulse appears so that the trailing edge cannot result in a positive pulse at the output of the monoflop 31, as is indicated in FIG. 2 between the instants $t_1$ and $t_2$. The monoflop 29 is preferably in the form of a retriggerable monoflop whose operating time $t$ is started afresh by each negative pulse, even if the time interval started by the preceding pulse has not yet ended.

The signals characteristic of the maxima of a colour which have been obtained by means of the device of FIG. 1 are fed to an evaluation circuit shown in FIG. 3 by means of which the colour associated with the maximum is established with the aid of the instant at which the maximum appears. The signal appearing at the output 33 of the monoflop 31 is first applied to each of the inputs of a plurality of NAND elements 351 to 356 which in the example of FIG. 3 enables six colours in all to be recognized alongside each other. The second inputs of the NAND elements 351 to 356 are connected each to the Q-output of a respective monoflop 371 to 376 the inputs of which are jointly connected to a terminal 39. The output of each NAND element 351 to 356 is connected to the PR-input of a respective D-flip-flop 411 to 416, whose Q-outputs are connected each to one input of a further respective NAND element 431 to 436. A negative signal appears at the outputs F1 to F6 of these NAND elements 431 to 436 as a function of the instant at which a maximum is detected in the video signal.

Each of the $\overline{Q}$-outputs of the flip-flops 411 to 415 is connected in the manner shown in FIG. 3 to a further input of one of the NAND elements 352 to 356, the fourth inputs of which, finally, are connected each to the $\overline{Q}$-output of one of the monoflops 371 to 375.

The colour "black" is recognized by connecting the $\overline{Q}$-outputs of all D-flip-flops 411 to 416 to a joint NAND element 45; when a black colour dot is scanned, a negative signal appears at the output S of this NAND element 45 whose seventh input is connected to the output W of a NAND element 49 serving for recognizing the colour "white." The output W is moreover connected to the second inputs of all NAND elements 431 to 436.

The colour "white" should always be present when the video signal, as for "black" does not show a maximum but, in contrast to black, has an intensity which is always above a characteristic threshold value. However, this condition is not always met in practice, because the sensitivity of the opto-electric transducer, the transmission properties of variable-density filter and the reflectivity of a white surface are not uniform over the whole spectral region. For this reason, at least one maximum will normally be obtained when scanning a white colour dot. In order to be able to recognize "white" in spite of this fact, a signal is generated at the output W by means of the evaluation circuit of FIG. 3 whenever the intensity of the video signal lies above a preselected threshold value during at least two of the time intervals $t_1$ to $t_6$. The threshold values and the associated time intervals $t_1$ to $t_6$ can be established by experiment and are then valid for the white colour used in the particular case. In the evaluation circuit of FIG. 3 there are provided three threshold values in three time intervals. For this purpose the $\overline{Q}$-outputs of the monoflops 371, 373 and 375 are connected each to the CI-input of a further D-flip-flop 51, 53 and 55, whose Q-outputs are connected to the three inputs of the NAND element 49. The D-inputs of the flip-flops 51 to 55 are jointly connected to the Q-output of a threshold switch 57 connected to the output 17.

Since the D- and CI-inputs of a D-flip-flop form an AND function due to interval wiring, positive signals can appear at its Q-output only when a negative signal is conducted to the CI-inputs, due to the control by the monoflops 371, 373 and 375, and an output signal of the threshold switch is simultaneously supplied to the D-inputs.

The evaluation circuit of FIG. 3 operates otherwise as follows. After a resetting pulse has been fed to the CR-inputs of all D-flip-flops via a terminal 59, a reading pulse is supplied via the terminal 39 at the moment when the scanning beam of the television camera 13 is at the start of a line; this reading pulse sets the Q-outputs of all monoflops 371 to 376 to "1." The switching times $t_1$ to $t_6$ of these monoflops are so determined that after the scanning of, for example, 1/6 of a line, the Q-output of the monoflop 371 again acquires the state "0," whilst the Q-outputs of the other monoflops 372 to 376 only reach the state "0" again after the scanning 2/6, 3/6 etc., lines. Depending on the position of the intensity maxima, switching times of different length may also be provided for the monoflops; this permits the switching times to be adapted to the colours used. If it is assumed that the video signal takes exactly the waveform shown in FIG. 2, i.e. that a signal appears at the output 33 only in the time interval between the moments $t_4$ and $t_5$, then a "1" is present at the outputs of all NAND elements 351 to 356 and, consequently, also at the outputs of all NAND elements 431 to 436 up to the time $t_4$, because at least one input of each NAND element is connected to potential "O."

Immediately after the time $t_4$, a signal "1" is present at the $\overline{Q}$-outputs of the monoflop 374 and the flip-flop 414 as well as at the Q-output of the monoflop 375. When at the moment shown in FIG. 2 a signal "1" also appears at the output 33, then the output of the NAND element 355 changes to the state "0" whereby the flip-flop 415 is set to "1" at its Q-output and remains in this state until a further resetting pulse is supplied via the terminal 59. Since it is also assumed in FIG. 2 that the video signal has only one maximum, i.e., that it is not associated with the colour "white" and, consequently, no signal "1" has appeared at the output of the threshold switch 57 during the time interval up to the moment $t_4$, the outputs of the flip-flops 51 and 53 remain in the state "0" so that the setting of the flip-flop 55 at its Q-output does not result in any change at the output of the NAND element 49.

When a complete line of the interference filter 9 has been scanned by means of the television camera 13, the Q-outputs of the flip-flops 415 and 55 are therefore on "1" whereas the Q-outputs of all other flip-flops are on "0." As a result, a static "0" appears only at the output F5 whereas the terminals F1 to F4, F6, W and S are all in the state "1."

When subsequent to the scanning of a complete line the outputs F1 to F6 as well as S and W are scanned by means of a clock signal and a conventional output gate, then only the channel connected to the output F5 has a signal which is unmistakably associated with the maximum of the video signal shown in FIG. 2.

It follows from the preceding description that, in addition to "black" and "white" as many colours can be detected or identified alongside each other as there are monoflops 37. The number of monoflops 37 which can be used depends upon the half-value width of the maxima in the spectral intensity distribution, as the switching times $t_1$ to $t_6$ of the monoflops 37 are determined by the half-value width. Experiments have shown that at least six colours can be recognized side by side by means of a normal variable-density interference band filter. The resolution can be further increased with a variable-density interference line filter. Further colours can be detected by using colours with several maxima in the spectral intensity distribution which lead to signals "0" at two or more outputs $F_1$ to $F_6$. In these cases these outputs must be connected to further evaluation units by means of which, for example, the colour "violet" is recognized when a signal "0" appears simultaneously, for example, at the outputs F1 and F6.

The return connection of the $\overline{Q}$-outputs of the flip-flops 411 to 415 to NAND elements 352 to 356 serves for the temporary blocking of the information transmission by these NAND elements when the signal appearing at the terminal 33 starts before one of the times $t_1$ to $t_6$ and ends only after these times, since according to FIG. 2 only the leading edge of the signals appearing at the output 33 is characteristic of the position of a maximum. If, for example, the signal at the output 33 starts before the instant $t_1$, then the $\overline{Q}$-output of the flip-flop 411 is first permanently set to "0" and the "correct" information is stored. The NAND element 352 is thereby permanently blocked and a change-over of the flip-flop 412 immediately after the moment $t_1$ when the signal is still at the output 33 is obviated. The "wrong" information is therefore not stored.

FIG. 4 shows an additional appliance for the device of FIG. 1. This additional appliance serves to scan the whole variable-density filter 9 in a continuous manner not only over its width but also over its height. In the example described it is assumed that a commercial television camera is used with 312 television lines which operates without interlaced scanning and where 6 percent of the image or 19 television lines are required for the frame flyback signal, whilst 64$\mu$sec are available for scanning one television line including the line flyback. It is further assumed that with this television camera the frame flyback signal and the line flyback signal are synchronized in such a way that both trailing edges appear exactly at the same moment. Finally, a total of 18 superimposed colour dots are projected on to the variable-density filter and appear on the filter as 18 horizontal superimposed colour lines to be successively scanned in the course of one image scanning period of the television camera 13.

In order to obviate complicated circuits, the variable-density interference filter 9 is projected on to the television camera in such a way that the 16th, 32th, 48th etc., television lines of the television camera are situated exactly in the middle of the first, second, third, etc., colour lines of the variable-density filter, i.e., that 16 television lines are allocated to each colour line of the filter.

Referring to FIGS. 1 and 4 an output 61 of the television camera 13 on which the line flyback signals appear is connected to the clock input of a shift register 65 containing 16 storage elements. The output 61 is also connected to one input of an AND element 67 at whose output, which can be connected to the terminal 59 of the evaluation circuit, reset pulses appear. An output 71 of the television camera 13 on which the frame flyback signals appear is connected to the input of a monoflop 73 whose Q-output is connected via an OR element 75 to the information input of the shift register 65. The output 71 is moreover connected via an inverting stage 77 to, on the one hand, one input of an AND element 79 whose other input is connected to the information output of the shift register 65 and whose output is connected to the other input of the OR element 75 and, on the one hand, to one input of a further AND element 81 whose other input is connected to the information output of the shift register 65 and at whose output, which can be connected to the terminal 39 of the evaluation circuit of FIG. 4, reading signals appear. Finally, the information output of the shift register is connected via an inverting stage 85 to the other input of the AND element 67.

This circuit operates as follows. The trailing edge of the frame flyback signal, which coincides in time with the trailing edge of the line flyback signal and, like the latter, is assumed to be a negative pulse edge, sets the monoflop 73 at its Q-output to "1." At this time the scanning beam is situated 16 television lines above the middle of the first colour line of the variable-density filter 9. The switching time of the monoflop 73 is so chosen that the Q-input remains somewhat longer (e.g. 100 $\mu$sec) on "1" as would be necessary for the scanning of a complete television line (64 $\mu$sec) including flyback. Consequently, the next line flyback pulse transmits the information which is ready at the output of the monoflop 75 to the shift register 65. During the subsequent second line flyback pulse, however, the output of the monoflop 73 is already reset to "0" so that no further information can be shifted into the shift register 65.

Each of the following line flyback pulses therefore advances only the information shifted by the first line flyback pulse into the shift register 65. With the 16th line flyback pulse this information appears at the output of the shift register 65 and is given off via the AND element 81 as a reading signal, because the frame flyback pulse is at this moment absent. With the 17th line flyback signal the information is again shifted in a cycle into the shift register 65 because the AND element 79 is accordingly prepared.

During the period of time when the information "1" is available at the output of the shift register 65, the AND element 67 is blocked so that the associated resetting pulse is suppressed. Only the next line flyback pulse leads to the resetting of the information which has been stored by the reading pulse in the flip-flops 411 to 415 (FIG. 3) and has meanwhile been scanned. If the trailing edges of the signals appearing at the terminal 59 are used for setting the information, then the leading edges can be used for scanning the outputs F1 to F6 or S and W. The operation is the same for the 32nd, 64th etc. until the 288th line flyback pulses.

With the 228th line flyback pulse the scanning of the 18 lines of the variable-density filter 9 is terminated, because the scanning beam of the television camera 13 is now in the middle of its 18th line. With the aid of any step-by-step switching device of known construction the image 1 can now be advanced by one column in the direction of the arrow R (FIG. 1) so that the next column of 18 colour dots is projected onto the variable-density filter 9 in the form of 13 lines. Simultaneously with this transport step the scanning beam of the television camera 13 scans also the lines 289 to 293 prior to the picture flyback whereby the information "1" is advanced to the fifth storage element of the shift register 65 without the appearance of a new reading pulse.

With the 294th line flyback there starts the frame flyback pulse which blocks the AND elements 79 and 81 so that with the 304th line flyback pulse the information "1" present in the shift register 65 can no longer be returned in a cycle to the first storage element. The shift register 65 therefore remains without information until the 312nd line flyback pulse, when the trailing edge of the frame flyback pulse and the trailing edge of a line flyback pulse appearing simultaneously again start the processes described above and the next column of the image 1 which has meanwhile been projected on to the variable-density filter 9 can be scanned. Consequently, an automatic resetting of the shift register results whenever more lines are provided for the picture flyback (19 lines) than for each line of the variable-density filter.

The invention is not restricted to the example described above. It is possible, for example, to use other television cameras (e.g., with interlaced scanning) and to scan more or less lines of the variable-density filter 9 during one image period of the television camera. Furthermore, the image advance can be replaced with a scanning head which can be shifted across the stationary image 1 and which houses the optical systems 3, 7 and 11 as well as the variable-density filter 9 and the light source 5, and which is passed across the image 1 in horizontal rows and vertical columns. If in the example described above the time between the 289th and the 312th line flyback pulses do not suffice for the advance of the image or of the scanning head, it is possible to suppress as many image scanning periods as are necessary to complete the transport step.

The description has so far started from the assumption that each colour dot is projected on to a colour line extending over the whole width of the variable-density interference filter and that it is then scanned by means of the scanning beam of the television camera 13. With this arrangement an image corresponding to the spectral intensity distribution of the colour is formed with the aid of the variable-density filter and, subsequently, an electric analogue signal whose time dependence corresponds to the local dependence of the image on the filter 9.

Figure 5:
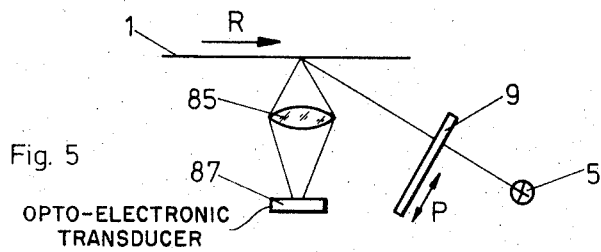

In contrast thereto, the colour dots are illuminated in the apparatus of FIG. 5 through a narrow region of the variable-density interference filter 9 whilst the reflected light is directly focussed on to an opto-electronic transducer 87 by means of an optical system 85. The time variation of the electric analogue signal appearing at the output of the opto-electronic transducer is obtained by a displacement of the variable-density filter perpendicularly to the path of rays, in the direction of the arrow P. A continuous displacement of the filter therefore leads to a signal the time variation of which exactly coincides with the curve shown in FIG. 2 for the output of the television camera 13, so that for evaluating this curve the input of the amplifier 15 (FIG. 1) can be connected to the output of the opto-electronic transducer, instead of to the output of the television camera 13. This arrangement is particularly advantageous, because it enables the transducer to be brought very close to the image to be scanned, in order to obviate loss of light. According to another variant, the relative movement between the light source and the variable-density filter can also be brought about by using as light source a lamp of beacon type whose rotating light beam in the form of a vertical slot is passed over the whole width of the filter. The reverse of the filter is directly projected on to the colour dot to be scanned, for example, by means of a light conductor cross-section converter.

Figure 6:
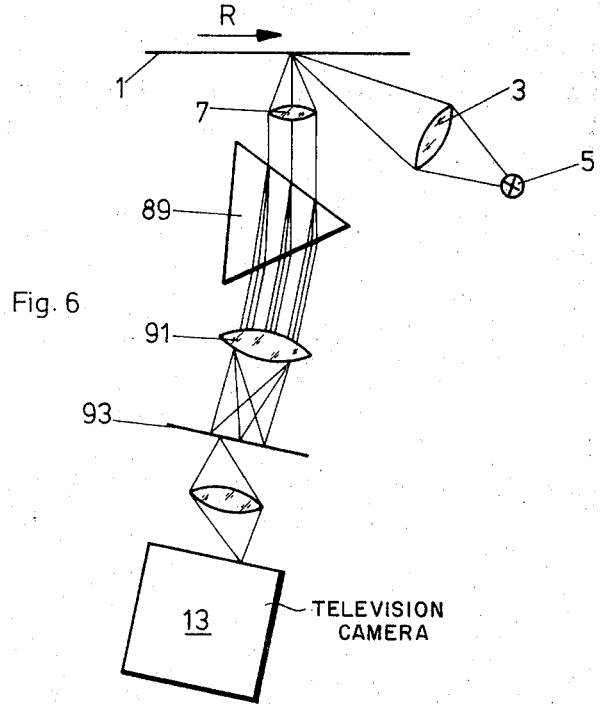

The embodiment of the invention illustrated in FIG. 6 differs from the versions of FIGS. 1 and 5 in that the variable-density interference filter is replaced by a refraction prism 89. The light beams appearing at the output of the prism 89 are projected either onto a ground glass plate 93 where they are scanned by means of the television camera 13, or directly on to the screen of the television camera. Similarly to the version of FIG. 1, an image is formed on the focal plane which corresponds to the spectral intensity distribution of the colour dot being scanned.

The embodiment illustrated in FIG. 7 differs from the embodiment of FIG. 5 in that the variable-density filter 9 is stationary and the narrow light beam to be analysed is moved over the whole width of the filter in the direction of the arrow L. An opto-electronic transducer is arranged behind the variable-density filter.

The movement of the narrow light beam over the width of the variable-density filter 9 can be carried out by projecting the colour dot scanned by means of an optical system 95 onto the filter 9 via a polygonal mirror 96; as in FIG. 7 the optical system may also contain the light source. Instead of the polygonal mirror, there may also be used revolving deflecting prisms or vibrating mirrors which are moved, for example, by means of electromagnetic or piezoelectric elements.

As shown in FIG. 8 it is also possible to arrange the variable-density interference filter 9 on the circumference of a rotating circular disc and to bring the circumference of the circular disc into the ray path reduced to a slot between the optical system 95 and the opto-electronic transducer 87. Such an arrangement is advantageous, because the opto-electronic transducer can be arranged immediately behind the variable-density filter whereby an additional lens is saved and the diffusion losses remain very low. Finally, an embodiment similar to FIG. 8 is obtained by mounting the variable-density interference filter on the side of a rotating cylinder in the interior of which the opto-electronic transducer is arranged, instead of mounting it on the circumference of a circular disc.

A variable-density interference filter is particularly well suited for the purpose of the invention, although it can be replaced as in FIG. 6 by refraction prisms or the usual diffraction grids. The advantage of a variable-density interference filter consists in that its transmissivity has an average value of about 45 percent which is very high. In the case where the transmissivity decreases or increases from longer to shorter wavelengths, this can easily be corrected by modifying in a suitable way the amplification of the signal appearing at the output of the television camera or of the opto-electronic transducer.

FIG. 9 illustrates the calibration curve of a commercial variable-density interference filter (for example, from Jenaer Glaswerke Schott & Gen., Mainz, Germany). The distance from the filter end of the side with blue transmissivity is plotted on the abscissa in mm, whilst the wavelength is plotted on the ordinate. Such a filter consists of a slightly wedge-shaped plate with a width of, e.g., 5 cm which is illuminated substantially perpendicularly and where the interferences of the 1st order are continuously distributed over the whole width of the plate. Apart from band filters, there may also be used line filters which usually have points of transmission for the second order (Veril S60 or Veril S200). The different points of measurement are obtained, for example, by illuminating the filter on one side with monochromatic light of a small half-value width and determining the position of the resulting transmission maximum on the other side of the filter.

The apparatus can be modified in many ways. In particular, in the method of which the maximum in the analogue signal corresponding to the spectral intensity distribution of the colour is established and subsequently evaluated, the analogue signal yields a pulse edge the time position of which exactly corresponds to the position of the maximum of the intensity distribution and which can be used for any switching operation. It is also possible to obtain the pulse edges by means other than the differentiation of the electric analogue signal, and the time intervals $t_1$ to $t_6$ (FIGS. 2 and 3) used for distinguishing the colours may be of identical or different length. For determining the time intervals $t_1$ to $t_6$, the monoflops 37 may be replaced with combinations of counting stages and gate circuits if the number and length of these time intervals is to be optional.

Finally, the invention is not restricted to the special method of obtaining the maxima of the spectral intensity distribution. In a modification of the embodiments according to FIGS. 1 and 5 to 8, FIG. 10 diagrammatically indicates that it is also possible to use various methods of light polarization for the resolution of the colours.

Figure 10:
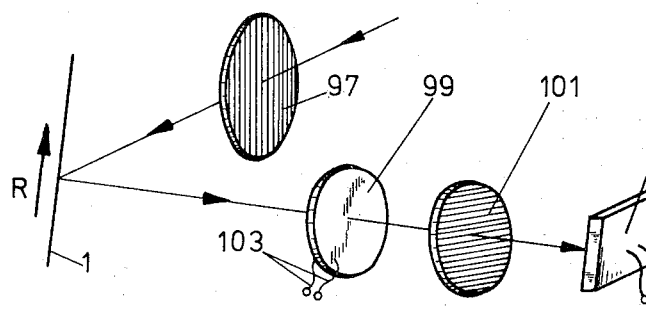

In FIG. 10 the light which is first polarized by means of a polarizer 97 and then reflected by a light point is conducted through a plate 99 consisting of an optical ferroelectric material and subsequently through an analyzer 101 which consists of a polarization filter and is followed by the opto-electronic transducer 87. An optical ferroelectric element is a ceramic body comprising, for example, lead-lanthanumzirconium-titanium and therefore call PLZT-ceramics. Electrodes 103 are deposited on the two broad sides of the plate 99 by evaporation. By applying a voltage to the electrodes 103, dipoles are straightened in the ferro-electric which render the ferroelectric doubly refractive so that the transmitted light is polarized or the polarization plane of polarized light is rotated. The degree of dipole straightening and the wavelength of the light which has been polarized or rotated by a certain angle depends upon the voltage applied to the electrodes 103. When, therefore, in FIG. 10 the polarized light transmitted through the plate 99 is scanned by means of the analyzer 101 which is permeable on a certain polarization plane, and when the voltage applied to the electrodes 103 is continuously varied, one narrow spectral region of the incident light after another is picked up by the transducer 87 so that an analogue signal appears at the output of the latter, which corresponds to the spectral intensity variation of the light which is incident on or is reflected by the colour dot and can be further processed in the manner described above.

Optical ferroelectrics of the type described above are manufactured, for example, by the firm Sandia (Sandia Laboratories, Albuquerque, New Mexico, U.S.A.).

The claims defining the invention are as follows:

1. Apparatus for automatically recognizing each of a plurality of colors, comprising in combination: at least one optoelectrical transducer; an optical scanning system for illuminating at least one color at a time and focussing the light received by said illumination from the color to the transducer; means associated with the transducer for scanning the spectrum of the color such that the transducer produces an electrical output signal the time variation of which corresponds to the spectral intensity curve of said color; an electrical circuit means including a differentiating element for receiving said output signal and for generating an electrical maximum signal as often as said output signal passes through a maximum; and evaluation means for receiving each of said maximum signals and converting said maximum signals to a digital signal associated with said color scanned.

2. Apparatus according to claim 1 wherein said optical system includes means for illuminating the color and for forcussing the light reflected by the color to the transducer.

3. Apparatus according to claim 1 wherein said optical system includes means for illuminating the color and for focussing the light transmitted by the color to the transducer.

4. Apparatus according to claim 1, wherein the scanning means comprises a diffraction grating.

5. Apparatus according to claim 1, wherein the transducer consists of a photocell.

6. Apparatus according to claim 1, wherein the scanning means has a variable-density interference filter.

7. Apparatus according to claim 6, wherein the interference filter has the form of a wedge-shaped plate.

8. Apparatus according to claim 1, wherein the scanning means comprises a refraction prism.

9. Apparatus according to claim 1, wherein the scanning means has an optical ferroelectric device.

10. Apparatus according to claim 1, wherein the transducer consists of a television camera.

11. Apparatus according to claim 1, wherein the differentiating element is connected to the input of a pulse former for the formation of a pulse edge corresponding to the position of the maximum of the intensity distribution.

12. Apparatus according to claim 11, wherein the output of the pulse former is connected to a plurality of gate circuits which are opened and blocked in different time intervals and are in turn connected to a plurality of storage elements.

13. Apparatus according to claim 12, wherein the gate circuits can be controlled by means of monoflops.

14. Apparatus according to claim 6 wherein said filter is linearly movable.

15. Apparatus according to claim 6, wherein said filter is rotatable.

16. Apparatus according to claim 6 wherein said filter is stationary.

17. Apparatus according to claim 6 wherein said filter has the form of a wedgeshaped plate.

18. Apparatus according to claim 6, wherein said filter has the form of a wedge-shaped cylinder.

19. Apparatus according to claim 12, wherein the gate circuits can be controlled by means of counting stages.

20. A method of automatically recognizing each of a plurality of colors comprising the steps of: optoelectrically scanning a color; generating electrical signals the time variation of which corresponds to the spectral intensity curve of the color; automatically deriving from said electrical signal a maximum signal as often as said electrical signal passes through a maximum; coverting the maximum signals of each electrical signal to a digital signal corresponding to the position of said maxima; and recognizing each color by determining the digital signal received by scanning said color.

21. A method according to claim 20, wherein the colors are scanned in reflection.

22. A method according to claim 20, wherein the maximum signal are derived from a continuous electrical signal corresponding to the total spectral intensity curve.

23. A method according to claim 22, wherein an analogue signal is obtained by first producing an image corresponding to the intensity distribution of the color to be scanned, and then continuously scanning this image.

24. A method according to claim 23, wherein an analogue signal is obtained by opto-electrically scanning the colour to be scanned and illuminating it for this purpose with light the wavelength of which continuously changes.

25. A method according to claim 23, wherein and analogue signal is obtained by illuminating the colour to be scanned with natural light and scanning it opto-electrically through a moving filter the transmission properties of which continuously change with the wavelength.

26. A method according to claim 20, wherein the colours are scanned in transmission or reflection.

27. A method according to claim 20, wherein the maximum signal are obtained by differentiation of the electrical signal.

28. A method according to claim 20, wherein the colours are recognized by subdividing the electrical signal into several time intervals and feeding the maximum signal obtained in the respective time intervals to different channels.

* * * * *